(12) United States Patent
Cox et al.

(10) Patent No.: US 7,318,387 B2
(45) Date of Patent: Jan. 15, 2008

(54) WATER INTAKE RISER

(75) Inventors: Ali Joseph Cox, Rijswijk (NL);
Michalakis Efthymiou, Rijswijk (NL)

(73) Assignee: Shell Oil Company, Houston, TX (US)

( * ) Notice: Subject to any disclaimer, the term of this patent is extended or adjusted under 35 U.S.C. 154(b) by 124 days.

(21) Appl. No.: 10/550,055

(22) PCT Filed: Mar. 22, 2004

(86) PCT No.: PCT/EP2004/050345

§ 371 (c)(1),
(2), (4) Date: Feb. 22, 2006

(87) PCT Pub. No.: WO2004/085238

PCT Pub. Date: Oct. 7, 2004

(65) Prior Publication Data

US 2006/0283367 A1    Dec. 21, 2006

(30) Foreign Application Priority Data

Mar. 25, 2003    (EP)    .................... 03251849

(51) Int. Cl.
*B63B 35/44*    (2006.01)
*E02D 5/62*    (2006.01)

(52) U.S. Cl. .................... 114/264; 405/224.2; 166/367

(58) Field of Classification Search .................. 114/198
See application file for complete search history.

(56) References Cited

U.S. PATENT DOCUMENTS

| 4,273,068 | A | 6/1981 | McNary | 114/264 |
| 5,660,233 | A | 8/1997 | Sparks | 166/367 |
| 2001/0041097 | A1 | 11/2001 | Finn | 405/224.2 |
| 2003/0021634 | A1* | 1/2003 | Munk et al. | 405/224.2 |

FOREIGN PATENT DOCUMENTS

WO    82/04234    12/1982

OTHER PUBLICATIONS

Ricardo Franciss, "Maximum stresses model test of a sea water lift casing to a Petrobras PXXV platform in Albacora field", International Offshore Engineering, proceedings of the 9th International Symposium on Offshore Engineering held at COPPE, Federal University of Rio de Janeiro, Brazil, Sep. 1995, pp. 153-166.

* cited by examiner

*Primary Examiner*—Jesús D Sotelo

(57) ABSTRACT

A water intake riser that can be suspended from a vessel having a riser connected to a riser hanger, which riser hanger includes a first tubular element, a second tubular element to which the riser is connected, a flexible load transfer element joining the tubular elements, and a hose of which the ends are secured to the adjacent ends of the tubular elements.

8 Claims, 3 Drawing Sheets

WATER INTAKE RISER

The present application is a 35 U.S.C. 371 national stage filing of PCT/EP2004/050345 filed Mar. 22, 2004 claiming priority from European patent application 03251849.0 filed Mar. 25, 2003, hereby incorporated by reference.

FIELD OF THE INVENTION

The present invention relates to a water intake riser. Such a water intake riser is used on a vessel to provide cooling water to a heat exchanger. In particular such a water intake riser is used on a vessel on which a plant for liquefying natural gas is arranged. In the specification and in the claims the word vessel is used to refer to a ship, a barge, a floating platform and so on.

BACKGROUND OF THE INVENTION

An example of such a riser is described in the article by R Franciss, Maximum stress model test of a seawater lift casing to a Petrobras PXXV platform in Albacora field, presented at 9th International symposium on Offshore Engineering, September 1995. The paper describes a floating offshore platform provided with water intake risers that are hingeably connected to the submerged pontoons of the platform.

SUMMARY OF THE INVENTION

The invention is directed to a water intake riser having a simple and reliable design.

To this end the water intake riser that can be suspended from a vessel according to the present invention comprises a riser connected to a riser hanger, which riser hanger comprises a first tubular element, a second tubular element to which the riser is connected, a flexible load transfer element joining the tubular elements, and a hose of which the ends are secured to the adjacent ends of the tubular elements.

The invention further relates to a vessel provided with a water intake riser.

BRIEF DESCRIPTION OF THE DRAWINGS

The invention will now be described by way of example with reference to the accompanying drawings, wherein.

DETAILED DESCRIPTION OF THE INVENTION

Figure 1:
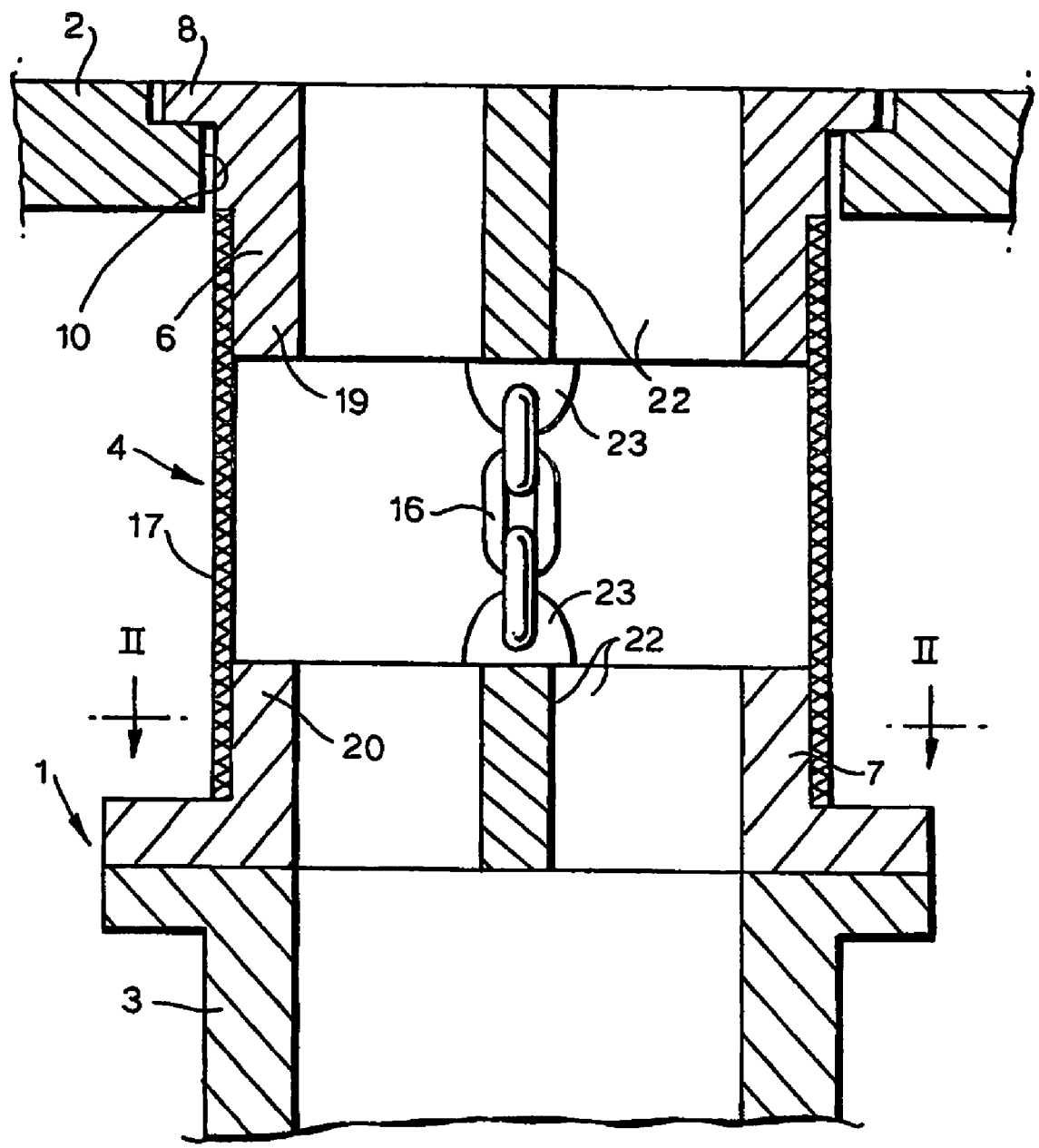
FIG. 1 shows schematically and not to scale a partial longitudinal section of the water intake riser according to the present invention.

Reference is now made to FIG. 1 showing schematically and not to scale the water intake riser 1 according to the present invention. The water intake riser 1 is suspended from a hull 2 of a vessel (not shown). The water intake riser 1 comprises an elongated tube 3 connected to a riser hanger 4. The riser hanger 4 comprises two tubular elements, a first tubular element 6 and a second tubular element 7. The upper end part of the first tubular element 6 has an open end provided with a suspension ridge 8. The suspension ridge 8 matches with a suitably formed opening 10 in the hull 2 so that the first tubular element 6 is supported in the opening 10, and thus secured to the vessel. Securing the first tubular element 6 to the vessel (not shown) allows suspending the water intake riser 1 from the hull 2.

The riser hanger 4 further comprises a second tubular element 7. The upper end of the elongated tube 3 is connected to the lower end of the second tubular element 7 by any suitable means. In FIG. 1 the diameter of the connection is larger than the diameter of the opening 10. However, suitably, the diameter of the opening 10 is so selected that the water intake riser can be lowered through it until the suspension ridge 8 is supported in the opening 10.

The riser hanger 4 further comprises a flexible load transfer element 16 joining the tubular elements 6 and 7. In the embodiment shown in FIG. 1, the flexible load transfer element 16 is a chain. The riser hanger 4 further comprises a hose 17 of which the ends are secured to the adjacent end parts 19 and 20 of the tubular elements 6 and 7. The hose 17 is secured in a watertight way to the end parts 19 and 20.

Figure 2:
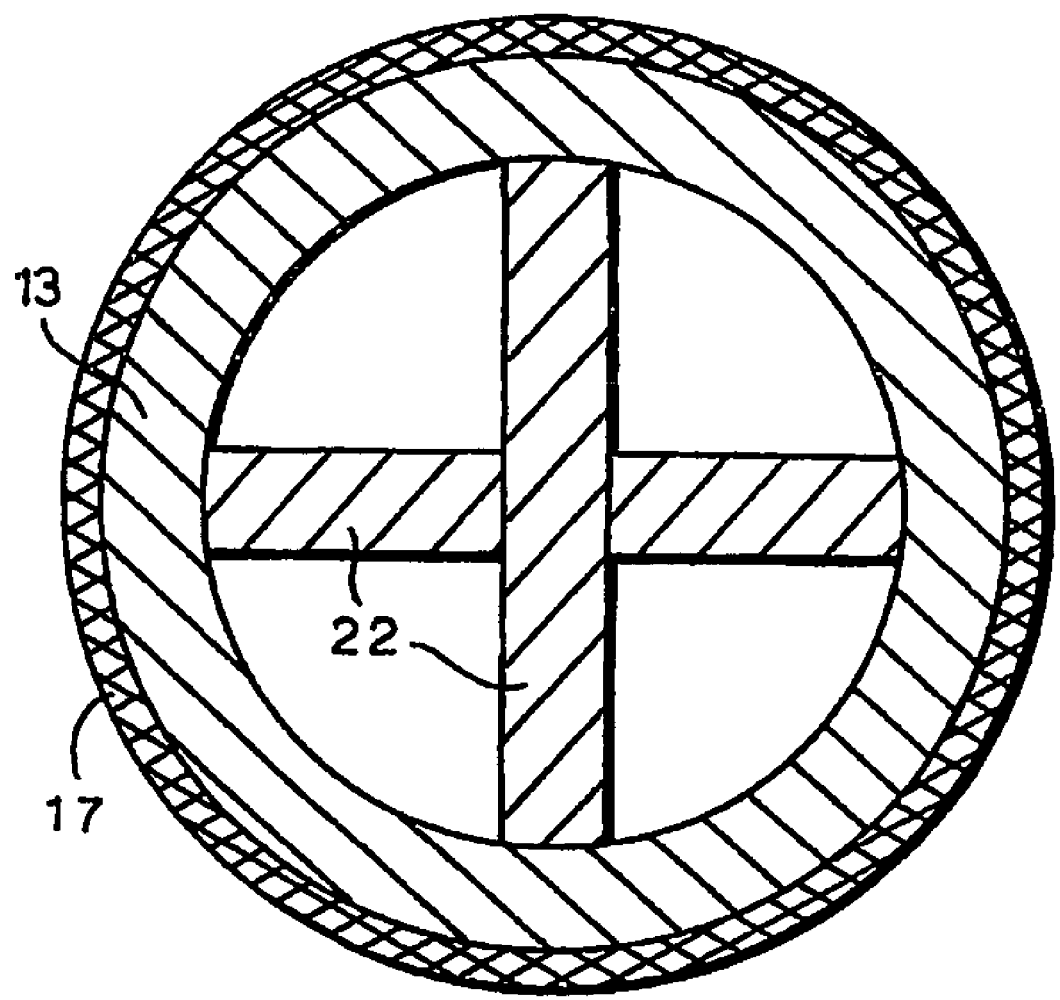
FIG. 2 shows a section along line II-II of FIG. 1.

Suitably, each tubular element 6 and 7 is provided with a cross-shaped internal 22 (see also FIG. 2) having means 23 for securing the flexible load transfer element 16 to the internal 22. The cross-shaped internal 22 is suitably welded to the inner surface of the tubular element 6 or 7 (shown as 13 in FIG. 2). For the sake of simplicity the welds have not been shown.

In the water intake riser 1 of the present invention the hose 17 forms a conduit for water, whereas the flexible load transfer element 16 transfers the self-weight and the dynamic loads of the elongated tube 3 to the first tubular element 6. In this way the function of transferring water is separated from transferring a load.

Figure 3:
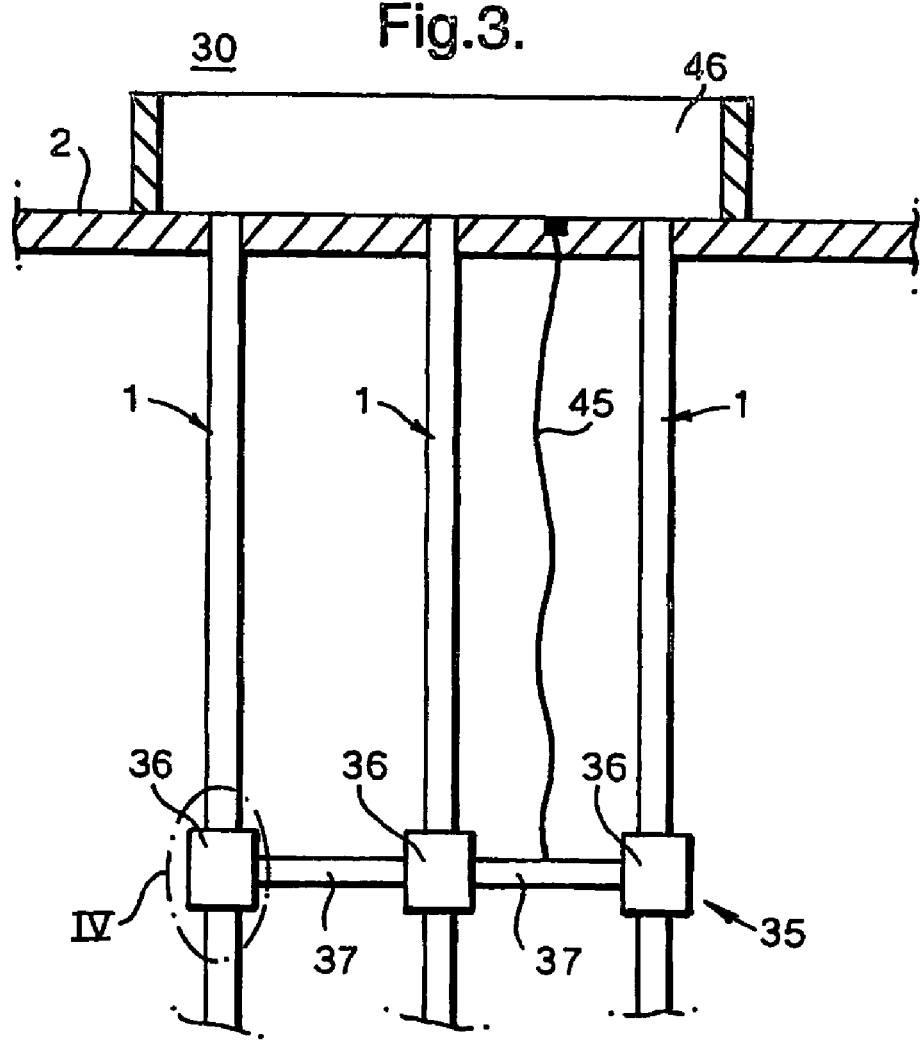
FIG. 3 shows schematically and not to scale a cross-section of the bottom of a vessel provided with three water intake risers according to the present invention.

Reference is now made to FIG. 3. FIG. 3 shows the lower part of a vessel 30 provided with at least two water intake risers. In this case the vessel 30 is provided with three water intake risers according to the present invention, wherein the first tubular element (not shown) is secured to the vessel 30 and suspended from the hull 2 as shown in more detail in FIG. 1.

In order to prevent the water intake risers 1 from colliding, there is provided at least one riser-spacer 35. The dynamic response of the water intake risers 1 will determine the number and the positions of the riser-spacers 35. In FIG. 3 only one riser-spacer 35 is shown.

Figure 4:
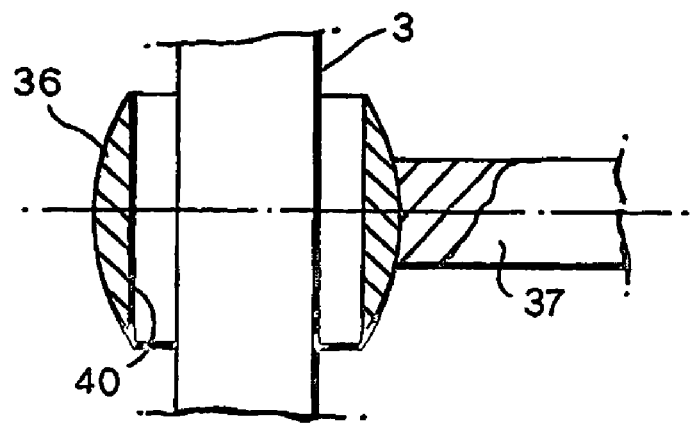
FIG. 4 shows schematically and on a larger scale detail IV of FIG. 3.

The riser-spacer 35 comprises interconnected guide sleeves 36, one guide sleeve 36 for each water intake riser 1. Bars 37 form the interconnection. Each guide sleeve 36 defines an aperture 40 (see FIG. 4), which aperture 40 allows the elongated tubes 3 to pass freely through it and allows limited rotation of the elongated tubes 3 about a horizontal axis. The horizontal axis is an axis that is lying in a plane of symmetry of the riser-spacer 35, which plane is perpendicular to the direction of passage through the aperture 40.

The riser-spacer 35 is suspended from the vessel 30 to a predetermined depth. In the embodiment shown in FIG. 3, the riser-spacer 35 is suspended by means of a cable 45 secured in the hull 2. In an alternative embodiment a chain replaces the cable 45, or one of the guide sleeves is secured to a water intake riser.

Suitably the length of the guide sleeve 36 is in the range of one to four times the outer diameter of the riser. The bars 37 interconnecting the guide sleeves 36 of the riser-spacer can be replaced by a frame or by a solid polygon. Suitably the thickness of the solid polygon is between three to four times the diameter of a riser in order to prevent vortex shedding of the riser.

The open upper ends of the water intake risers 1 open into a receptacle 46 inside the vessel 30 from which the water is withdrawn (not shown) for use as cooling water.

Suitably the number of water intake risers is between two and eight.

What is claimed is:

1. A water intake riser that can be suspended from a vessel comprising a riser connected to a riser hanger, which riser hanger comprises: a first tubular element; a second tubular element to which the riser is connected; a flexible load transfer element joining the tubular elements; and a hose of which the ends are secured to the adjacent ends of the tubular elements.

2. The water intake riser according to claim 1, wherein each tubular element is provided with a cross-shaped internal having means for securing the flexible load transfer element to the internal.

3. The water intake riser according to claim 1, wherein the flexible load transfer element is a chain.

4. A vessel provided with at least one water intake riser that can be suspended from the vessel comprising a riser connected to a riser hanger, which riser hanger comprises: a first tubular element; a second tubular element to which the riser is connected; a flexible load transfer element joining the tubular elements; and a hose of which the ends are secured to the adjacent ends of the tubular elements, wherein the first tubular element is secured to the vessel.

5. The vessel according to claim 4, which is provided with at least two water intake risers and with at least one riser-spacer comprising: interconnected guide sleeves; one guide sleeve for each riser; wherein each guide sleeve defines an aperture; which aperture allows a riser to pass freely through it and allows limited rotation of the riser about a horizontal axis; and wherein each riser-spacer element is suspended from the vessel to a predetermined depth.

6. The vessel according to claim 5, wherein the number of water intake risers is between two and eight.

7. The vessel according to claim 5, wherein the length of the guide sleeve is in the range of one to four times the diameter of the riser.

8. The vessel according to claim 4, wherein the hull of the vessel is provided with at least one opening for the at least one water intake riser; and wherein an upper end of the first tubular element of the at least one water intake riser is supported in the opening.

* * * * *